Sept. 26, 1933. J. BRUNSWICK 1,928,524
CELLULAR CUSHION TIRE OF RUBBER FOR VEHICLE WHEELS
Filed April 23, 1931 2 Sheets-Sheet 1
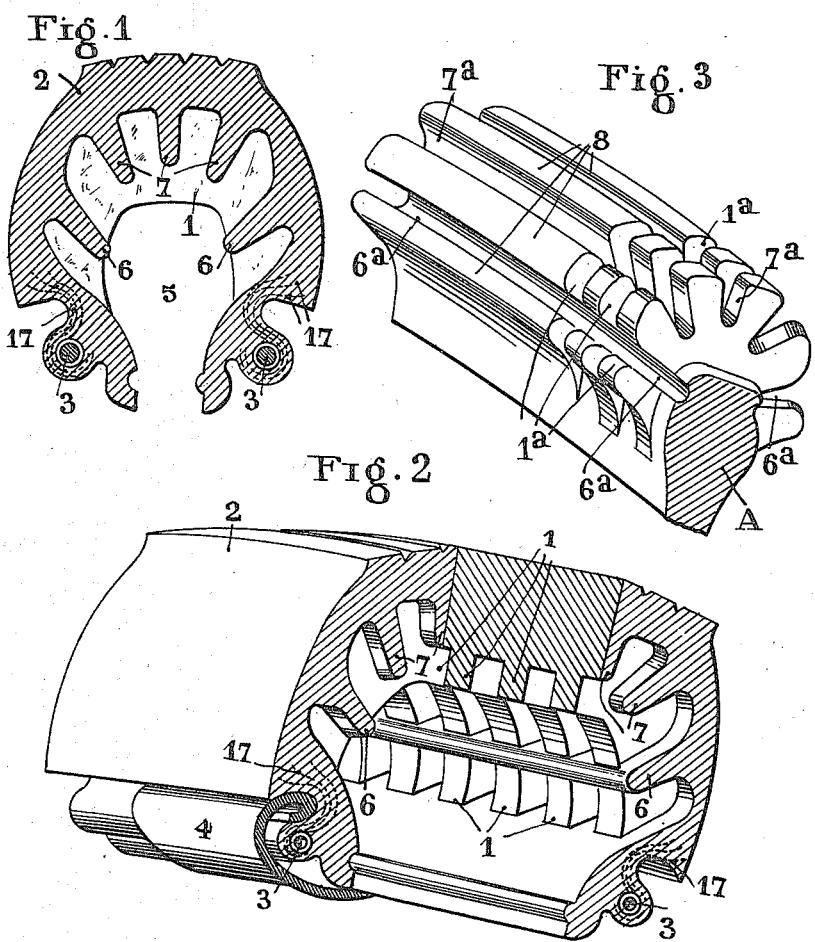
Inventor:
J. Brunswick
by
E. F. Wenderoth
Atty Sept. 26, 1933.   J. BRUNSWICK   1,928,524
CELLULAR CUSHION TIRE OF RUBBER FOR VEHICLE WHEELS
Filed April 23, 1931   2 Sheets-Sheet 2
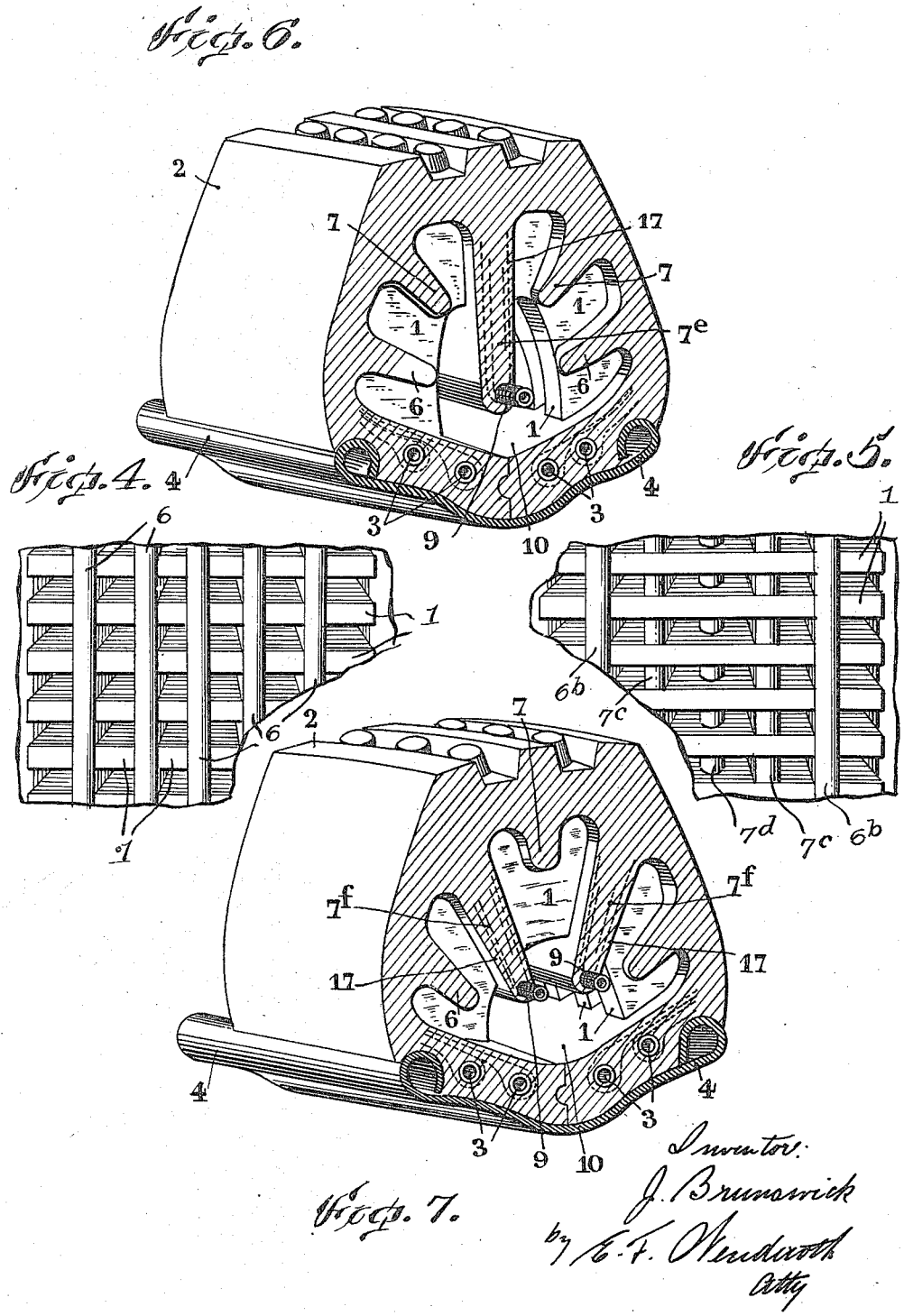

Patented Sept. 26, 1933

1,928,524

UNITED STATES PATENT OFFICE 1,928,524

CELLULAR CUSHION TIRE OF RUBBER FOR VEHICLE WHEELS

Jules Brunswick, Paris, France

Application April 23, 1931, Serial No. 532,297, and in France April 25, 1930

4 Claims. (Cl. 152—1)

This invention relates to improvements in cellular cushion tires of rubber for vehicle wheels adapted to impart increased capacity for resistance and increased resiliency to such tires so as to render possible increase of load on the tires notwithstanding the presence of obstacles and irregularities of the track.

Among cellular tires heretofore known and proposed are tires having transverse partitions parallel to one another, and separated by intervals or gaps forming cells. If these tires are subjected to a load which is fairly heavy in relation to their section, they are liable to flatten during the rolling movement, which causes crushing and tilting of the transverse partitions; there results considerable wear by friction of the surfaces rubbing on one another as well as heating, which detracts from the capacity for resistance of the rubber.

The invention obviates these drawbacks and ensures better stability without diminishing the resilience, while preventing tilting and contact of the transverse partitions.

With the above object in view the transverse partitions are interconnected by longitudinal partitions substantially perpendicular to the transverse partitions and forming therewith a cellular structure obtained by moulding rubber under high pressure; the cohesion of this structure is such that the tire has a uniform resilience and displays no weak point.

In order to obtain regular and precise binding together of the several moulded rubber partitions, it is necessary to form all the parts in special moulds from the general description of which there will be readily understood the possibility of realizing the herein described complex cellular system.

In order to leave no doubt regarding the nature of the invention there are described below several embodiments by way of example only with reference to the accompanying drawings in which:

Fig. 1 is a transverse section of a tire according to the invention.

Fig. 2 is a perspective view partly in section of this tire.

Fig. 3 shows in perspective the core of a mould for forming the tire shown in Figs. 1 and 2.

Figs. 4 and 5 are developed views showing partitions on the internal surface of the tire, representing different modes of interconnecting the partitions.

Fig. 6 is a perspective view in transverse section of another modification incorporating means for placing the partitions under permanent tension.

Fig. 7 is a perspective view also in transverse section showing a further modification.

Referring to Figs. 1 and 2, there are shown at 1 the transverse partitions formed in known manner in the interior of the cellular tire 2 held by flexible tension members 3 to the rim 4; as shown, the partitions 1 enclose a central cavity 5 (Fig. 1).

According to the invention the transverse partitions 1 are interconnected by longitudinal partitions of which preferably lateral partitions 6 extend inwardly to the cavity 5 and of which other partitions 7 stop short of the cavity 5; the assembly thus includes two sets of partitions which in the example illustrated intersect at right angles and define the boundaries of cells of rectangular section.

Fig. 3 illustrates the principal element or core of the mould for producing the cavities and recesses intended to form the profiles of the partitions 1, 6 and 7; this core is utilized in conjunction with two or more metallic envelopes or shells which define the exterior surface of the tire.

The segment shown in Fig. 3 forms part of a torus formed from a steel blank A and profiled by turning in manner to give it the appearance indicated at 8 where there are seen the profiles $6a$ and $7a$ of the longitudinal circular partitions 6 and 7. To provide for the production of the transverse partitions 1 there are formed in the blank A by milling or otherwise transverse grooves $1^a$ of appropriate shape. The torus is divided and adjusted in usual manner in order to permit removal from the mould of the cellular tire obtained after the latter has been subjected to the operation of vulcanizing the rubber.

It should be understood that, without departure from the scope of the invention, modifications may be made in the structure, that there may be utilized for the realization of the invention any suitable materials, and that, further, the forms may be varied while satisfying the conditions and obtaining the object sought.

Thus, as is shown in Fig. 4, internal longitudinal partitions 6 may project further inwardly than the transverse partitions 1, or may in part project further inwards as at $6^b$, while the other longitudinal partitions $7^c$ project inwards to the same extent, and the partitions $7^d$ project inwards to less extent than the transverse partitions 1 (Fig. 5).

Obviously, the partitions may be otherwise interconnected, for example, obliquely, so that there may be combined with the forms of cellular tires above described known means adopted in the formation of tires, such as wires, ordinary woven fabric, or fabric woven on the bias as at 17.

More particularly and according to Figs. 6 and 7 there may be prolonged towards the base one or more of the longitudinal partitions, for example, 7e in Fig. 6 and 7f in Fig. 7. The partitions 7e and 7f are armoured at their lower part with an extensible member 9 of hard steel wire coiled in spiral form.

This armouring has for its object to maintain the partitions 7e and 7f in a state of constant tension while the tire is in place on the rim. Fitting in place brings about a certain elastic tension of the armouring 9 as well as of the members 3 and this state of tension of the longitudinal partitions 7e and 7f is communicated to the transverse partitions 1 and gives to the whole a rigidity which enables it to resist efforts to which it is subjected when rolling on the ground. The armouring members 9 are embodied in the longitudinal partitions 7e and 7f which are preferably lined with a bias woven fabric as indicated at 17.

The annular recess 10 is shown in Figs. 6 and 7, but this recess may be dispensed with, while the armoured longitudinal partitions 7e and 7f may be combined with non-recessed transverse partitions 1 which isolate completely the several cells.

What is claimed is:—

1. A cellular cushion tire of rubber for vehicle wheels, having, in combination, moulded internal transverse partitions and longitudinal internal partitions, the walls and cells thus formed being sufficiently closely spaced to reinforce each other, and the cells being open to the interior of the tire.

2. A cellular cushion tire according to claim 1 in which the central longitudinal partitions project inwardly at least as far as the transverse partitions.

3. A cellular cushion tire according to claim 1 in which the central longitudinal partitions project inwardly less than the transverse partitions.

4. A cellular cushion tire according to claim 1 having one or more of the central longitudinal partitions projecting inwardly beyond the internal transverse partitions, said longitudinal partitions being prolonged towards the base of the tire and armoured.

JULES BRUNSWICK.